United States Patent
Yoon et al.

[11] Patent Number: 5,454,910
[45] Date of Patent: Oct. 3, 1995

[54] PULP-LIKE SHORT FIBERS FROM LIQUID CRYSTAL POLYESTERS

[75] Inventors: Han S. Yoon; Tae W. Son; Chul J. Lee; Byung G. Min, all of Seoul; Jae W. Cho, Kyongido, all of Rep. of Korea

[73] Assignee: Korea Institue of Science and Technology, Seoul, Rep. of Korea

[21] Appl. No.: 303,878

[22] Filed: Sep. 9, 1994

Related U.S. Application Data

[63] Continuation of Ser. No. 995,917, Dec. 22, 1992, abandoned, which is a continuation of Ser. No. 753,357, Aug. 30, 1991, abandoned.

[30] Foreign Application Priority Data

Aug. 30, 1990 [KR] Rep. of Korea ............ 90-13481

[51] Int. Cl.$^6$ ............................................. D21H 13/16
[52] U.S. Cl. .................. 162/157.3; 162/146; 162/157.2; 428/357; 428/359
[58] Field of Search ................... 162/146, 157.2, 162/157.3, 157.5; 264/148; 428/357, 359; 528/206

[56] References Cited

U.S. PATENT DOCUMENTS

| | | |
|---|---|---|
| 3,637,595 | 1/1972 | Cottis et al. |
| 3,778,410 | 12/1973 | Kubfuss et al. |
| 3,804,805 | 4/1974 | Kubfuss et al. |
| 3,975,487 | 8/1976 | Cottis et al. |
| 3,991,013 | 11/1976 | Pletcher |
| 4,066,620 | 1/1978 | Kleinschuster |
| 4,067,852 | 1/1978 | Calundann |
| 4,075,262 | 2/1978 | Schsefgen |
| 4,083,829 | 4/1978 | Calundann et al. |
| 4,118,372 | 10/1978 | Schaefgen |
| 4,130,545 | 12/1978 | Calundann |
| 4,159,365 | 6/1979 | Payet |
| 4,161,470 | 7/1979 | Calundann |
| 4,181,792 | 1/1980 | Jackson et al. |
| 4,183,895 | 1/1980 | Luise |
| 4,184,996 | 1/1980 | Calundann |
| 4,188,476 | 2/1980 | Irwin |
| 4,256,624 | 3/1981 | Calundann |
| 4,330,457 | 5/1982 | East et al. |
| 4,395,301 | 7/1983 | Kastelic et al. ............ 162/157.3 |
| 4,500,699 | 2/1985 | Irwin et al. |

*Primary Examiner*—Peter Chin
*Attorney, Agent, or Firm*—Oblon, Spivak, McClelland, Maier, & Neustadt

[57] ABSTRACT

Pulp-like short fibers prepared from liquid crystal polyesters capable of forming an anisotropic melt phase at a temperature of 200° C. to 400° C. and having a molecular weight of 2,000 to 100,000 are provided. These fibers consist of microfibrils and have the following highly-oriented fiber characteristics and properties:

(a) Tensile strength: 5–30 g/den.;
(b) Modulus of elasticity: 200–1,500 g/den.;
(c) Orientation angle as determined by an X-ray diffraction: below 20°;
(d) Thickness distribution: 0.1–50 μm;
(e) Length distribution: 0.1–50 mm; and
(f) Specific surface area as determined by a nitrogen adsorption method: 3–30 m$^2$/g.

31 Claims, 3 Drawing Sheets

PULP-LIKE SHORT FIBERS FROM LIQUID CRYSTAL POLYESTERS

This application is a Continuation of application Ser. No. 07/995,917, filed on Dec. 22, 1992, now abandoned which is a CON of Ser. No. 07/753,357 filed Aug. 30, 1991, now abandoned.

BACKGROUND OF THE INVENTION

1. Field of the Invention

The present invention relates to highly molecular-oriented pulp-like short fibers prepared from liquid crystal polyesters, taking advantage of the unique properties of a melt liquid crystal phase, without a substantial spinning process.

2. Description of the Prior Art

Generally, various processes, comprising forming a melt liquid crystal phase by heating a liquid crystal polyester, and then spinning the resulting melt liquid crystal phase to produce fibers, are well known. In such spinning processes, the spinning step wherein a fiber shape is formed by passing the melt liquid crystal phase through microholes is essentially required as well as a drawing step wherein constituent molecular chains are arranged in parallel with the fiber axis must be followed so that fibers having a molecular orientation can be produced.

Recently, it has been known that some of aromatic polyesters form a liquid crystal phase which is optically anisotropic in melt state. See, for instance, U.S. Pat. Nos. 3,637,595; 3,759,870; 3,778,410; 3,804,805; 3,991,013; 4,066,620; 4,067,852; 4,075,262; 4,083,829; 4,118,372; 4,130,545; 4,140,846; 4,161,470; 4,181,792; 4,183,895; 4,184,996; 4,188,476; 4,219,461; 4,256,624; 4,318,841; 4,431,770; 4,330,4657; 4,370,466; and 4,473,682. It has also been known that in a liquid crystal phase, molecules orient spontaneously, and constituent molecular chains are easily oriented in the direction of shear even by small shear force; see Polymer Liquid Crystals, edited by A. Ciferr;, W. R. Krigbaum and R. B. Meyer, Academic Press, 1982, pp 247–273. It has, therefore, been known that if the liquid crystal polyesters are subjected to spinning, long fibers having high strength and high modulus of elasticity can be produced; see, for instance, U.S. Pat. Nos. 3,975,487; 4,159,365; 4,503,105; 4,574,066; and 4,500,696; Japanese Patent Application KoKai Nos. 131020/1983; 159816/1982; 191219/1983; 49257/1984; 78232/1984; 113818/1986; and 238821/1987. In processes for the production of fibers employing a spinning process, melt liquid crystal has to pass through microholes. It is, therefore, difficult to produce fibers using polymers having high molecular weight or high viscosity, and long post-treatment at high temperature is required after spinning. In addition, since relatively high temperature is required during the spinning, the possibility of thermal decomposition is high. For these reasons, processes for the production of fibers by spinning are expensive, and thus, the price of fibers is high. Moreover, these fibers are in the form of a long bar that has a regular shape and a uniform surface. Therefore, unlike pulp which can have various shapes and surfaces, these fibers have only limited thickness and surface area.

SUMMARY OF THE INVENTION

Given the above, an object of the present invention is to provide a novel, pulp-like short fibers having a molecular orientation, which have never been prepared by conventional processes, from liquid crystal polyesters. The short fibers are prepared by a process according to the invention. This process does not depend on spinning at all and involves forming high-oriented, fibril-like molded articles by applying shear force to a melt liquid crystal phase, taking advantage of spontaneous molecular orientation properties, characteristics peculiar to a liquid crystal, and then cutting and beating the resulting molded articles to give pulp-like short fibers.

Pulp-like short fibers of the present invention are characterized by irregularity in shape and surface, fineness and variety in size, very large surface area, and easiness in making paper, as well as having a highly oriented fiber characteristic.

Additionally, since pulp-like short fibers of the present invention have high strength and high modulus of elasticity, large surface area and variety and fineness in size, they exhibit excellent characteristics as a reinforcing material and are useful in preparing high-tenacity, weather-proof papers and sheets. Short fibers of the invention are produced by a simple, mechanical operation to cause spontaneous molecular orientation without a spinning process through microholes, and thus, they can be prepared as highly-oriented fibers from polymers having high molecular weight or high viscosity under conditions using relatively low temperature.

Furthermore, short fibers according to the invention can be produced on a large scale by a simple process without conventional spinning process. Therefore, the present invention has the advantage of very low production cost.

DETAILED DESCRIPTION OF THE INVENTION

The term "liquid crystal polyesters" as used herein refers to those substances that can be melted, and when melted, exhibit an optical anisotropy and fluid temperature regions. Such liquid crystal polyesters may include homopolymers or copolymers consisting of aromatic diols, aromatic dicarboxylic acids or aromatic hydroxycarboxylic acids, or copolymers consisting of aliphatic dicarboxylic acids and the foregoing aromatic diols, dicarboxylic acids or hydroxycarboxylic acids, which enter an anisotropic melt phase at temperatures ranging from 200° C. to 450° C. and have a molecular weight of 2,000 to 200,000.

Aromatic diols which can be used in the present invention may include hydroquinone, phenylhydroquinone, methylhydroquinone, tert.-butylhydroquinone, chlorohydroquinone, resorcinol, 4,4'-dihydroxybiphenyl, 3,3'-dihydroxybiphenyl, 2,6-dihydroxynaphthalene, 2,7-dihydroxynaphthalene, 1,5-dihydroxynaphthalene, 1,4-dihydroxynaphthalene, 2,6-dihydroxyanthraquinone, 4,4'-dihydroxybenzophenone, 3,4'-dihydroxybenzophenone, 3,3'-dihydroxybenzophenone, 4,4'-dihydroxydiphenylmethane, 4,4'-dihydroxydiphenylethane, 2,2'-bis(4-hydroxyphenyl)propane, 4,4'-dihydroxydiphenyl ether, 4,4'-dihydroxydiphenyl sulfone, 3,3'-dihydroxydiphenyl sulfone, 4,4'-dihydroxydiphenyl sulfide, or their derivatives substituted by alkyl, aryl, alkoxy or halogen, or a mixture containing two or more thereof.

Aromatic dicarboxylic acids may include any one of terephthalic acid, chloroterephthalic acid, bromoterephthalic acid, phenylterephthalic acid, isophthalic acid, 4,4'-biphenyldicarboxylic acid, 3,3'-biphenyldicarboxylic acid, 4,4'-paraterpenyldicarboxylic acid, 2,6-naphthalene dicarboxylic acid, 2,7-naphthalenedicarboxylic acid, 1,4-naphthalenedicarboxylic acid, 1,5-naphthalenedicarboxylic acid, 1,2-bis(4-carboxyphenoxy)ethane, 1,4-bis(4-carboxyphenoxy)butane, 4,4'-dicarboxydiphenyl ether, 3,4'-dicarboxydiphenyl ether, 3,3'-dicarboxydiphenyl ether, 4,4'-dicarboxybenzophenone, 3,4'-dicarboxybenzophenone, 3,3'-dicarboxybenzophenone, 4-carboxyphenylacetic acid, 4-carboxyphenylpropionic acid, and their derivatives substituted by alkyl, aryl, alkoxy or halogen, or a mixture containing two or more thereof.

Aromatic hydroxycarboxylic acids may include any one of parahydroxybenzoic acid, 3-methyl-4-hydroxybenzoic acid, 3-chloro-4-hydroxybenzoic acid, metahydroxybenzoic acid, 2-hydroxynaphthalene- 6-carboxylic acid, 4-hydroxy-4-biphenylcarboxylic acid, 3-hydroxy-4'-carboxybenzophenone, 4-hydroxycinnamic acid, 4-hydroxyphenylacetic acid, 3-hydroxyphenylacetic acid, 4-hydroxyphenylpropionic acid, 2-(4-carboxyphenoxy)ethanol, or their derivatives substituted by alkyl, aryl, alkoxy or halogen, or a mixture containing two or more thereof.

Aliphatic diols may include any one of ethyleneglycol, 1,3-propanediol, 1,4-butanediol, trans-1,4-dihydroxycyclohexane, cis-1,4-dihydroxycyclohexane, trans-1,4-cyclohexanedimethanol, cis-1,4-cyclohexanedimethanol, or a mixture containing two or more thereof.

Aliphatic carboxylic acids may include any one of succinic acid, glutaric acid, adipic acid, 3-methyladipic acid, pimelic acid, suberic acid, azelaic acid, sebasic acid, trans-1,4-dicarboxylcyclohexane, cis-1,4 -dicarboxylcyclohexane, or a mixture containing two or more thereof.

Liquid crystal polyesters which are used in preparing pulp-like short fibers according to the present invention may include the following:

(1) copolyesters comprising 20 to 80 moles of parahydroxybenzoic acid and 20 to 80 moles of any of the aforementioned aromatic hydroxycarboxylic acids except the parahydroxybenzoic acid.

(2) copolyesters comprising 10 to 70 moles of parahydroxybenzoic acid, 15 to 45 moles of any of the aforementioned aromatic diols and 15 to 45 moles of any of the aforementioned aromatic dicarboxylic acids;

(3) copolyesters comprising 10 to 80 moles of any of the aforementioned hydroxycarboxylic acids, 10 to 45 moles of any of the aforementioned aromatic diols and 10 to 45 moles of any of the aforementioned dicarboxylic acids;

(4) homo- or copolyesters comprising 50 moles of any of the aforementioned aromatic diols and 50 moles of any of the aforementioned aromatic dicarboxylic acids;

(5) copolyesters comprising 30 to 70 moles of any of the aforementioned aromatic hydroxycarboxylic acids, 15 to 35 moles of any of the aforementioned aromatic dicarboxylic acids and 15 to 35 moles of any of the aforementioned aliphatic diols;

(6) copolyesters comprising 20 to 80 moles of any of the aforementioned aromatic hydroxycarboxylic acids, 10 to 40 moles of any of the aforementioned aromatic dicarboxylic acids, 5 to 35 moles of any of the aforementioned aromatic diols and 5 to 35 moles of any of the aforementioned aliphatic diols; and (7) copolyesters comprising 50 moles of any of the aforementioned aromatic dicarboxylic acids, 15 to 35 moles of any of the aforementioned aromatic diols and 15 to 35 moles of any of the aforementioned aliphatic diols.

According to the present invention, a molecular weight of the liquid crystal polyesters ranges from 2,000 to 100,000, but preferably 5,000 to 50,000. Such molecular weight may be determined by an end group determination via an infrared spectroscopy or a nuclear magnetic resonance spectroscopy or by a light scattering technique in a dilute pentafluorophenol solution.

In addition, according to the present invention, as a liquid crystal polyester may be preferably used those polyesters having an inherent viscosity ($\eta inh$) of about 2.0 dl/g to 12.0 dl/g as calculated from a relative viscosity ($\eta rel$) determined in a pentafluorophenol solution in a concentration (c) of 0.1% by weight at 60° C. according to the following equation:

$$\eta inh = \frac{\ln(\eta rel)}{c}$$

A temperature at which liquid crystal polyesters, which may be used in the present invention, are formed into an anisotropic melt phase ranges from 200° C. to 400° C., but preferably from 220° C. to 260° C. The term "temperature forming an anisotropic melt phase" means a temperature at which liquid crystal polyesters begin the transition from a solid phase to a fluid, anisotropic melt phase.

Examples of suitable liquid crystal polyesters which can be used in the present invention may include the following:

(1) copolyesters comprising 30 to 70 moles of parahydroxybenzoic acid and 30 to 70 moles of 2-hydroxynaphthalene-6-carboxylic acid;

(2) copolyesters comprising 20 to 80 moles of parahydroxybenzoic acid and 20 to 80 moles of any of aromatic hydroxycarboxylic acid selected from metahydroxybenzoic acid, 2-hydroxynaphthalene- 6-carboxylic acid, 4'-hydroxy-4-biphenylcarboxylic acid, 4-hydroxyphenylacetic acid, 4-hydroxyphenylpropionic acid and 2-(4-carboxyphenoxy) ethanol, or a mixture containing two or more thereof;

(3) copolyesters comprising 30 to 70 moles of parahydroxybenzoic acid, 15 to 35 moles of 4,4'-dihydroxybiphenyl, X moles of terephthalic acid and Y moles of isophthalic acid wherein X is 15 to 30, Y is 5 to 20, and X+Y is 15 to 35;

(4) copolyesters comprising 30 to 70 moles of parahydroxybenzoic acid, 15 to 35 moles of 4,4'-dihydroxybiphenyl, Z moles of 2,6-naphthalenedicarboxylic acid, Y mole(s) of isophthalic acid and X mole(s) of terephthalic acid wherein Z is 5 to 35, X and Y are each 0 to 30, and X+Y+Z is 15 to 35;

(5) copolyesters comprising 30 to 70 moles of parahydroxybenzoic acid, 15 to 35 moles of phenylhydroquinone, X moles of terephthalic acid and Y mole(s) of isophthalic acid wherein X is 15 to 35, Y is 0 to 20, and X+Y is 15 to 35;

(6) copolyesters comprising 30 to 70 moles of parahydroxybenzoic acid, 15 to 35 moles of phenylhydroquinone, Z moles of 2,6-naphthalenedicarboxylic acid, Y mole(s) of isophthalic acid and X mole(s) of terephthalic acid wherein Z is 5 to 35, X and Y are each 0 to 30, and X+Y+Z is 15 to 35;

(7) copolyesters comprising 30 to 70 moles of parahydroxybenzoic acid, 15 to 35 moles of methylhydroquinone, X moles of terephthalic acid and Y moles of isophthalic acid wherein X and Y are each 5 to 30, and X+Y is 15 to 35;

(8) copolyesters comprising 30 to 70 moles of parahydroxybenzoic acid, 15 to 35 moles of methylhydroquinone, Z moles of 2,6-naphthalenedicarboxylic acid, Y mole(s) of isophthalic acid and X mole(s) of terephthalic acid wherein Z is 5 to 35, X and Y are each 0 to 30, and X+Y+Z is 15 to 35;

(9) copolyesters comprising 30 to 70 moles of parahydroxybenzoic acid, 15 to 35 moles of hydroquinone, X moles of terephthalic acid and Y moles of isophthalic acid wherein X and Y are each 5 to 30, and X+Y is 15 to 35;

(10) copolyesters comprising 30 to 70 moles of parahydroxybenzoic acid, 15 to 35 moles of hydroquinone, Z moles of 2,6-naphthalenedicarboxylic acid, Y moles of isophthalic acid and X moles of terephthalic acid wherein Z is 5 to 35, X and Y are each 5 to 30, and X+Y+Z is 15 to 35;

(11) copolyesters comprising 30 to 70 moles of 2-hydroxynaphthalene- 6-carboxylic acid, 15 to 35 moles of 4,4'-dihydroxybiphenyl, X moles of terephthalic acid and Y mole(s) of isophthalic acid wherein X is 5 to 35, Y is 0 to 30, and X+Y is 15 to 35;

(12) copolyesters comprising 10 to 70 moles of 2-hydroxynaphthalene- 6-carboxylic acid, 15 to 45 moles of phenylhydroquinone, X moles of terephthalic acid and Y mole(s) of isophthalic acid wherein X is 5 to 45, Y is 0 to 20, and X+Y is 15 to 45;

(13) copolyesters comprising 30 to 70 moles of 2-hydroxynaphthalene- 6-carboxylic acid, 15 to 35 moles of methylhydroquinone, X moles of terephthalic acid and Y moles of isophthalic acid wherein X and Y are each 5 to 30, and X+Y is 15 to 35; (14) copolyesters comprising 30 to 70 moles of 2-hydroxynaphthalene- 6-carboxylic acid, 15 to 35 moles of hydroquinone, X moles of terephthalic acid and Y moles of isophthalic acid wherein X and Y are each 5 to 30, and X+Y is 15 to 35;

(15) copolyesters comprising 30 to 70 moles of a mixture of parahydroxybenzoic acid and 2-hydroxynaphthalene-6-carboxylic acid, 15 to 35 moles of 4,4'-dihydroxybiphenyl, X moles of terephthalic acid and Y mole(s) of isophthalic acid wherein X is 15 to 35, Y is 0 to 20, and X+Y is 15 to 35;

(16) copolyesters comprising 30 to 70 moles of a mixture of parahydroxybenzoic acid and 2-hydroxynaphthalene-6-carboxylic acid, 15 to 35 moles of phenylhydroquinone, X moles of terephthalic acid and Y mole(s) of isophthalic acid wherein X is 15 to 35, Y is 0 to 20, and X+Y is 15 to 35;

(17) copolyesters comprising 30 to 70 moles of a mixture of parahydroxybenzoic acid and 2-hydroxynaphthalene-6-carboxylic acid, 15 to 35 moles of methylhydroquinone, X moles of terephthalic acid and Y mole(s) of isophthalic acid wherein X is 15 to 35, Y is 0 to 20, and X+Y is 15 to 35;

(18) copolyesters comprising 30 to 70 moles of a mixture of parahydroxybenzoic acid and 2-hydroxynaphthalene-6-carboxylic acid, 15 to 35 moles of hydroquinone, X moles of terephthalic acid and Y mole(s) of isophthalic acid wherein X is 15 to 35, Y is 0 to 20, and X+Y is 15 to 35;

(19) copolyesters comprising 10 to 80 moles of one or two or more aromatic hydroxycarboxylic acids selected from parahydroxybenzoic acid, 2-hydroxynaphthalene-6-carboxylic acid, metahydroxybenzoic acid, 4'-hydroxy-4-biphenylcarboxylic acid, 4-hydroxyphenylacetic acid, 4-hydroxyphenylpropionic acid and 2-(4-carboxyphenoxy)ethanol, 10 to 45 moles of one or two or more aromatic diols selected from hydroquinone, phenylhydroquinone, methylhydroquinone, tert.-butylhydroquinone, chlorohydroquinone, 4,4'-dihydroxybiphenyl, 2,6-dihydroxynaphthalene, 2,7-dihydroxynaphthalene, 2,6-dihydroxyanthraquinone, resorcinol, 4,4'-dihydroxybenzophenone, 4,4'-dihydroxydiphenylmethane, 4,4'-dihydroxydiphenylethane, 2,2-bis(4-hydroxyphenyl) propane, 4,4'-dihydroxydiphenyl ether, 4,4'-dihydroxydiphenylsulfone and 4,4'-dihydroxydiphenylsulfide, and 10 to 45 moles of one or two or more aromatic carboxylic acids selected from terephthalic acid, isophthalic acid, 2,6-naphthalene dicarboxylic acid, 2,7-naphthalenedicarboxylic acid, 4,4'-biphenyldicarboxylic acid, 4,4'-dicarboxydiphenyl ether, 3,4'-dicarboxydiphenyl ether and 1,2-bis(4-carboxyphenoxy)ethane;

(20) copolyester comprising 50 moles of phenylhydroquinone and 50 moles of terephthalic acid;

(21) copolyesters comprising 50 moles of one or two or more aromatic diols selected from hydroquinone, phenylhydroquinone, methylhydroquinone, tert.-butylhydroquinone, chlorohydroquinone, 4,4'-dihydroxybiphenyl, 2,6-dihydroxynaphthalene, 2,7-dihydroxynaphthalene, 2,6-dihydroxyanthraquinone, resorcinol, 4,4'-dihydroxybenzophenone, 4,4'-dihydroxydiphenylmethane, 4,4'-dihydroxydiphenylethane, 2,2-bis(4-hydroxyphenyl) propane, 4,4'-dihydroxydiphenyl ether, 4,4'-dihydroxydiphenyl sulfone and 4,4'-dihydroxydiphenyl sulfide and 50 moles of one or two or more aromatic dicarboxylic acids selected from terephthalic acid, isophthalic acid, 2,6-naphthalenedicarboxylic acid, 2,7-naphthalenedicarboxylic acid, 4,4'-biphenyldicarboxylic acid, 4,4'-dicarboxydiphenyl ether, 3,4'-dicarboxydiphenyl ether and 1,2-bis(4-carboxyphenoxy)ethane;

(22) copolyesters comprising 30 to 70 moles of parahydroxybenzoic acid, 15 to 35 moles of terephthalic acid and 15 to 35 moles of ethylene glycol;

(23) copolyesters comprising 20 to 80 moles of one or two or more aromatic hydroxycarboxylic acids selected from parahydroxybenzoic acid, 2-hydroxynaphthalene-6-carboxylic acid, metahydroxybenzoic acid, 4'-hydroxy-4-biphenylcarboxylic acid, 4-hydroxyphenylacetic acid, 4-hydroxyphenylpropionic acid and 2-(4-carboxyphenoxy)ethanol, 10 to 40 moles of one or two or more of aromatic dicarboxylic acids selected from terephthalic acid, isophthalic acid, 2,6-naphthalenedicarboxylic acid, 2,7-naphthalenedicarboxylic acid, 4,4'-biphenyldicarboxylic acid. 4,4'-dicarboxydiphenyl ether, 3,4'-dicarboxydiphenyl ether and 1,2-bis(4-carboxyphenoxy)ethane, and 10 to 40 moles of one or two or more of aliphatic diols selected from ethylene glycol, 1,3-propanediol, 1,4-butanediol, trans-1,4-dihydroxycyclohexane, cis-1,4-dihydroxycyclohexane, trans-1,4-cyclohexanedimethanol and cis-1,4-cyclohexanedimethanol;

(24) copolyesters comprising 10 to 70 moles of parahydroxybenzoic acid, 15 to 45 moles of one or two or more aromatic dicarboxylic acids selected from terephthalic acid, isophthalic acid, 2,6-naphthalenedicarboxylic acid, 2,7-naphthalenedicarboxylic acid, 4,4'-biphenyldicarboxylic acid, 4,4'-dicarboxydiphenyl ether, 3,4'-dicarboxydiphenyl ether and 1,2-bis(4-carboxyphenoxy)ethane, X moles of one or two or more aromatic diols selected from hydroquinone, phenylhydroquinone, methylhydroquinone, tert.-butylhydroquinone, chlorohydroquinone, 4,4'-dihydroxybiphenyl, 2,6-dihydroxynaphthalene, 2,7-dihydroxynaphthalene, 2,6-dihydroxyanthraquinone, resorcinol, 4,4'-dihydroxybenzophenone, 4,4'-dihydroxydiphenylmethane, 4,4'-dihydroxydiphenylethane, 2,2-bis(4-hydroxyphenyl)propane, 4,4'-dihydroxydiphenyl ether, 4,4'-dihydroxydiphenyl sulfone and 4,4'-dihydroxydiphenyl sulfide, and Y moles of one or two or more aliphatic diols selected from ethylene glycol, 1,3-propanediol, 1,4-butanediol, trans-1,4-dihydroxycyclohexane, cis-1,4-dihydroxycyclohexane, trans-1,4-cyclohexanedimethanol and cis-1,4-cyclohexanedimethanol wherein X and Y are each 5 to 40, and X+Y is 15 to 45; and (25) copolyesters comprising 15 to 40 moles of one or two or more aromatic diols selected from hydroquinone, phenylhydroquione, methylhydroquinone, tert.-butylhydroquinone, chlorohydroquinone, 4,4'-dihydroxybiphenyl, 2,6-dihydroxynaphthalene, 2,7-dihydroxynaphthalene, 2,6-dihydroxyanthraquinone, resorcinol, 4,4'-dihydroxybenzophenone, 4,4'-dihydroxydiphenyl methane, 4,4'-dihydroxydiphenylethane, 2,2-bis(4-hydroxyphenyl) propane, 4,4'-dihydroxydiphenyl ether, 4,4'-dihydroxydiphenyl sulfone and 4,4'-dihydroxydiphenyl sulfide, 10 to 35 moles of one or two or more aliphatic diols selected from the group consisting of ethyleneglycol, 1,3-propanediol, 1,4-butanediol, trans-1,4-dihydroxycyclohexane, cis-1,4-dihydroxycyclohexane, trans-1,4-cyclohexanedimethanol and cis-1,4-cyclohexanedimethanol, and 50 moles of one or two or more aromatic dicarboxylic acids selected from terephthalic acid, isophthalic acid, 2,6-naphthalenedicarboxylic acid, 2,7-naphthalenedicarboxylic acid, 4,4'-biphenyldicarboxylic acid, 4,4'-dicarboxydiphenyl ether, 3,4'-dicarboxydiphenyl ether and 1,2-bis(4-carboxyphenoxy)ethane.

According to the present invention, short fibers are prepared by heating the liquid crystal polyesters mentioned above in an extruding container to create an anisotropic melt, and extruding the resulting anisotropic melt through an extrusion die under stretching to form fibril-like extrudates having high orientation, followed by cutting and beating the resulting fibril-like extrudates.

In preparing the pulp-like short fibers according to the present invention by extruding, the temperature at which the liquid crystal polyesters are formed into an extrudable, anisotropic melt phase ranges between 220° C. and 400° C., but preferably between 240° C. and 380° C. Practically, it is difficult to fluidize liquid crystal polyesters below 220° C. and to process them above 440° C. because of their thermal decomposition.

In producing pulp-like short fibers according to the present invention, it is important to form an anisotropic melt having high orientation by heating liquid crystal polyesters to a temperature sufficient to melt them completely to give hot melts, followed by cooling the resulting hot melts. Pulp-like short fibers according to the invention cannot be prepared from the hot melts since they exhibit a low viscosity and cannot be effectively molecular-oriented by shear force. On the other hand, the highly-oriented, anisotropic melt can be easily formed into a highly-oriented fibril-like extrudate by extrusion and stretching. Upon extruding the anisotropic melt, a slit die, an arc die or a tube die can be used as an extrusion die, and an extrusion die having the length longer than its thickness is advantageously used in producing highly-oriented, fibril-like extrudates. It is also important to stretch in high draw ratio before or after extrusion prior to cooling and solidification of the anisotropic melt which is discharged from an extrusion die before or after extrusion. Here, a suitable extrusion die has the ratio of length (L) to thickness (t) higher than 1. However, considering difficulties from the practical processes, the L/t value should be from 5 to 50, but preferably from 10 to 30. If the L/t value is too low, the orientation of a fibril-like extrudate is lowered, and if too high, it is difficult to extrude the anisotropic melt. Additionally, although the extruded anisotropic melt already has the molecular orientation in the direction of extrusion after it passed the extrusion die, it is necessary to stretch the extruded melt in a draw ratio of 2 to 100, but more preferably 5 to 50 in order to enhance the orientation.

The term "draw ratio" means a ratio of a linear rate at which an extrudate is drawn to the front to that at which the melt liquid crystal phase passes through an extrusion die. A higher draw ratio is effective in increasing the ratio of an extruded anisotropic melt. A higher draw ratio is advantageous in orientating molecules, but causes difficulties in manufacturing processes. A lower draw ratio has a tendency to lower the orientation of fibril-like extrudates.

Figure 1:
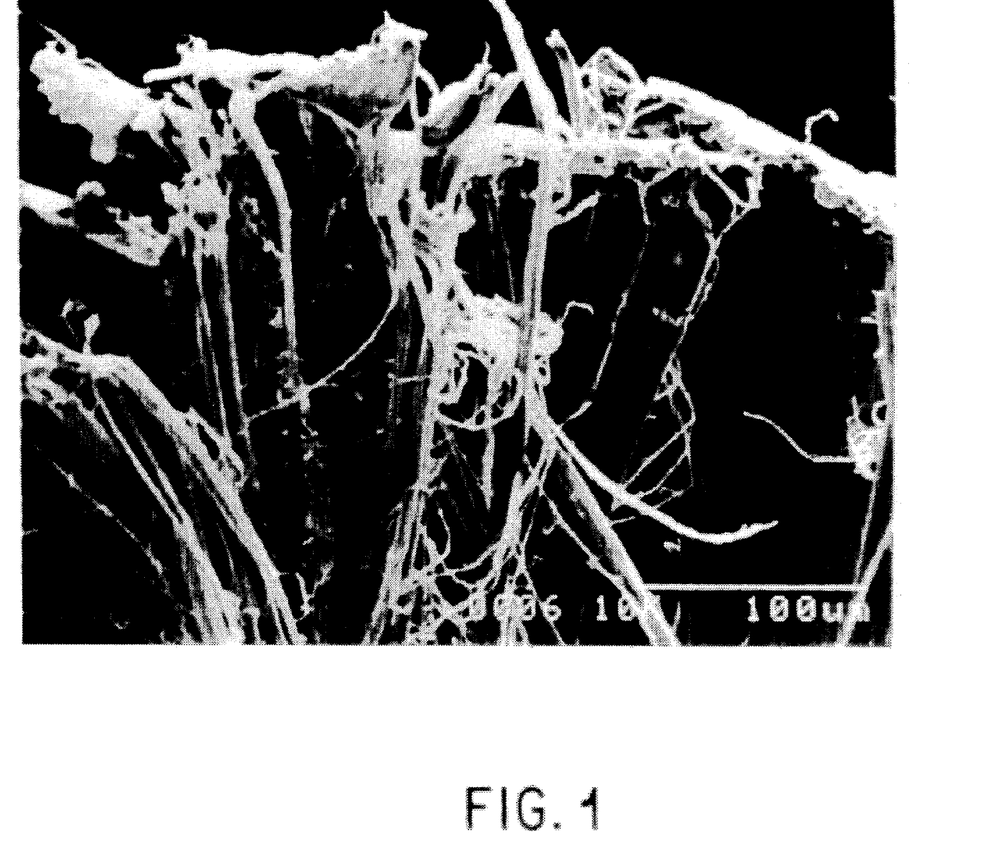
FIG. 1 is a scanning electron microphotograph of fibril-like shaped articles. It can be seen that the internal structure of the articles consists of bundles of microfibrils and that fibrils are easily separated from one another to form pulp-like short fibers.

Highly-oriented, fibril-like extrudates thus prepared have an internal structure consisting of fine fibril bundles as shown in FIG. 1. It shows that the fine fibrils are easily separated from one another to form pulp-like short fibers.

The fibril-like extrudates can be further extrudated into fibril-like extrudates having a higher orientation or strength by heat treatment or heat drawing. Highly-oriented fibril-like extrudates thus prepared are produced into pulp-like short fibers according to the present invention by cutting them into an appropriate length followed by beating.

Pulp-like short fibers according to the present invention have properties of highly-oriented fibers, such as a tensile strength between 5 g/den. and 30 g/den., a modulus of elasticity between 200 g/den. and 1500 g/den., and an orientation angle less than 25°. However, these fibers can be refined to have a tensile strength between 10 g/den. and 25 g/den., a modulus of elasticity between 300 g/den. and 1,000 g/den. and an orientation angle less than 20°. Here, the properties, including tensile strength, modulus of elasticity and orientation angle, are not directly measured for pulp-like short fibers but measured for fibrous samples taken from fibril-like extrudates prior to beating. This means that the microstructure and mechanical properties of fibers do not change during beating and these properties are accepted properly as characteristics of pulp-like short fibers.

Figure 2:
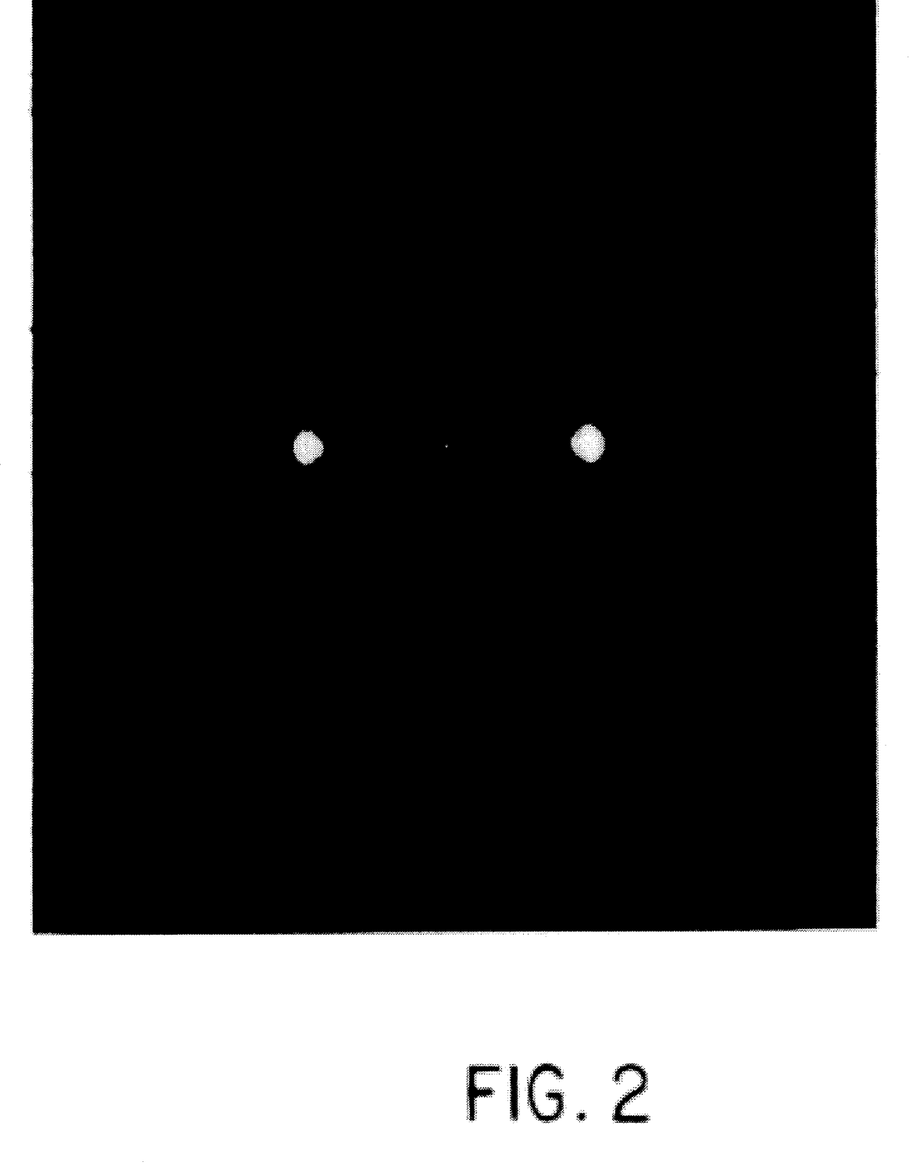
FIG. 2 is an X-ray diffraction photograph of fibril-like shaped articles. It shows that a fiber structure having high molecular orientation is formed.

FIG. 2 is an X-ray diffraction photograph of fibrous samples taken from fibril-like extrudates according to the present invention. It shows that a fiber structure having high molecular orientation has been formed. The orientation angle is a measure indicating a molecular orientation and is measured in degrees of angle calculated from the peak width at the one half value of a diffraction curve as scanned in the azimuthal direction at the main peak position of the equator direction on X-ray diffraction patterns of fiber samples. The main peak position changes depending on the composition of liquid crystal polyesters, but generally appears near $2\theta=20°$.

Figure 3:
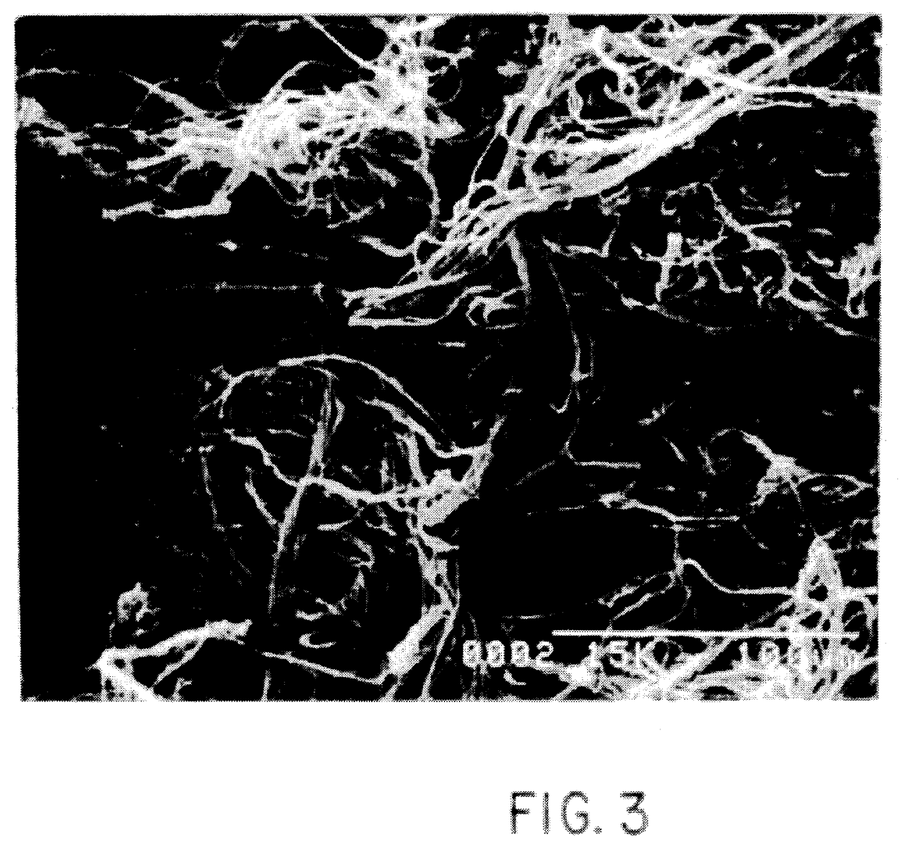
FIG. 3 is an electron microphotograph of pulp-like short fibers consisting of liquid crystal polyesters. It can be seen that the pulp-like short fibers are composed of microfibrils, and have irregular, various shapes and surfaces.

Pulp-like short fibers according to the invention are characterized by having highly-oriented fiber characteristics and additionally having irregularity in surface, fineness and variety in size, very large surface area and microfibrils consisting of the fiber. FIG. 3 is an electron microphotograph of pulp-like short fibers according to the invention. It shows that the fibers are composed of microfibrils, and have irregular and various shapes and surfaces. Pulp-like short fibers according to the invention have a thickness distribution of 0.1 μm to 50 μm and a length distribution of 0.1 mm to 50 mm, and the specific surface area, as determined by a nitrogen adsorption method, of 3 $m^2/g$ to 30 $m^2/g$, preferably between 5 $m^2/g$ and 20 $m^2/g$. These results indicate that the pulp-like short fibers have a much larger surface than conventional as-spun fibers in a rod form do. Staple fibers having a thickness of about 10 μm have a specific surface area less than 1 $m^2/g$. The size of these pulp-like short fibers can be changed depending on beating conditions and the extent to be beaten. Further, pulp-like short fibers of the invention consist of platen microfibrils having a thickness of 0.01 μm to 1 μm, and have an irregular shape and numerous crevices and branches on the surface, a good dispersibility, and are easily prepared into paper.

Pulp-like short fibers according to the invention have high strength and modulus of elasticity, large surface area, and fineness and variety in size, and exhibit excellent characteristics as a reinforcing material and, thus, are useful in manufacturing high-tenacity, weather-proof, special papers and sheets.

The following examples are presented as specific illustrations of the claimed invention. It should be understood, however, that the invention is not limited to the specific details set forth in the examples.

EXAMPLE 1

Liquid crystal polyesters composed of 60 moles of paraacetoxybenzoic acid and 40 moles of 2-acetoxynaphthalene-6-carboxylic acid and having a logarithmic viscosity of 6.5 were placed into a cylinder of an extruder, which is also equipped with a piston, a filter and a slit-type extrusion die and can be enclosed, heat and keep a constant temperature. Then, the polyesters were heated at 320° C. until they were completely melted. The resulting melt was cooled to 290° to give an anisotropic melt. By operating the piston at this temperature, a pressure of 8 atm. was applied to the resulting anisotropic melt. The anisotropic melt was, then, extruded through the slit die having thickness, width and length of 0.25 mm, 20 mm and 3 mm, respectively. Immediately after the extrusion, the anisotropic melt was stretched in a draw ratio of 22 while being quenched by cold air blown into the cylinder to give tape-shaped continuous extrudates. The extrudates thus formed were composed of fibrous substances consisting of numerous highly-oriented fibrils and were easily divided into in their length directions to allow easy production of fibers. Sample fibers were taken from the resulting extrudates, and their physical properties were measured. The sample fibers had a maximum tensile strength of 11.7 g/den., an elasticity modulus of 422 g/den., and an orientation angle of 17.2° as determined by an X-ray diffraction. The fibers were cut into 20 mm in length and beaten with a beater to prepare pulp-like short fibers. The resulting pulp-like short fibers have thicknesses ranging from 0.1 μm to 20 μm and lengths ranging from 0.1 mm to 20 mm, and the specific surface area of 9 $m^2/g$ as determined by a nitrogen adsorption method.

EXAMPLE 2

The same polymers as employed in Example 1 were extruded at 320° C. with the same extruder as used in Example 1. The liquid having high fluidity was cooled and solidified while being flowed down through the slit die to form low-oriented extrudates. The resulting low-oriented extrudates exhibited little orientation on X-ray diffraction patterns. It was also found that cutting and beating of the low-oriented extrudates could not provide pulp-like short fibers.

EXAMPLE 3

67.5 G(0.375 mol.) of paraacetoxybenzoic acid and 28.7 g (0.125 mol.) of 2-acetoxynaphthalene-6-carboxylic acid were placed in a polymerizing flask equipped with a mechanical stirrer, a nitrogen inlet and a condenser, and heated to gradually raise the temperature from room temperature to 250° C. under a nitrogen stream to dissolve the mixture clearly. The mixture was stirred at 250° C. over a period of about 3 hours while acetic acid formed by the reaction involved was removed through the condenser. Then, the mixture was brought to 280° C. and the mixture was then subjected to polymerization over a period of about 2 hours. Next, the temperature was elevated to 320° C. and then the polymerization was further carried out over a period of about 30 minutes. In order to increase the degree of polymerization, the introduction of nitrogen was stopped, and the polymerization was still further carried out for about 30 minutes under reduced pressure of about 0.2 mmHg. After the completion of polymerization, the resultant polymers were cooled to room temperature and pulverized. And then they were extracted with acetone to remove unreacted materials and dried in a vacuum oven at 130° C. for about 2 hours. The polymers thus obtained had a logarithmic viscosity of 5.2. These polymers exhibited a melt endotherm peak in the neighborhood of 298° C. and an optical anisotropy at the temperature higher than 298° C. when the melting temperatures thereof were measured by a differential scanning calorimeter running at a heating rate of 20° C. per minute under a nitrogen stream. The polymers were placed in a cylinder of an extruder, which was also equipped with a piston, a filter and a slit-type extrusion die and could be enclosed, heat and keep a constant temperature. The polymers were heated to 320° C. to melt them completely and then were cooled to 300° C. to obtain an anisotropic melt. At this temperature, the resultant anisotropic melt was pressurized to a pressure of 10 atm. by operating the piston to extrude it through the slit die having thickness, width and length of 0.25 mm, 20 mm and 3 mm, respectively. Immediately after the extrusion, the resulting extrudates were stretched in a draw ratio of 15 while being quenched by cold air blown into the cylinder to give tape-shaped continuous extrudates. (The resulting tape-shaped extrudates were composed of fibrous materials consisting of numerous highly-oriented fibrils and were easily divided into in their length directions to form fibers.) Next, physical properties of sample fibers taken from the resulting extrudates were measured. It was found that the sample fibers had a maximum tensile strength of 10.7 g/den., an elasticity modulus of 464 g/den. and an orientation angle of 18.3° as determined by an X-ray diffraction. These fibers were cut into 20 mm in length and beaten by a beater to prepare pulp-like short fibers. Pulp-like short fibers thus prepared had thicknesses ranging from 0.1 μm to 20 μm, lengths ranging from 0.1 mm to 20 mm and a specific surface area of 13 $m^2/g$ as determined by a nitrogen adsorption method.

EXAMPLE 4

Tape-shaped extrudates obtained from Example 3 were subjected to heat drawing and heat treatment at 300° C. for 30 minutes to give fibril-like extrudates, whose mechanical properties were improved. Physical properties of fiber samples taken from the resulting fibril-like extrudates were, then, measured. It was found that the fiber samples had a maximum tensile strength of 16.8 g/den., an elasticity modulus of 764 g/den., and an orientation angle of 15.7° as determined by an X-ray diffraction. The fibril-like fibers were cut into 20 mm in length and beaten with a beater to produce pulp-like short fibers. Pulp-like short fibers thus produced had a thicknesses ranging from 0.1 μm to 30 μm, lengths ranging from 0.1 mm to 20 mm and a specific surface area of 7 m²/g as determined by a nitrogen adsorption method.

EXAMPLE 5

28.8 G (0.16 mol.) of paraacetoxybenzoic acid, 27.6 g (0.12 mol.) of 2-acetoxynaphthalene-6-carboxylic acid and 30.7 g (0.12 mol.) of 4-acetoxy-4'-biphenylcarboxylic acid were placed into a melt polymerization apparatus. The temperature of the apparatus was then gradually elevated from room temperature to 260° C. under a nitrogen stream, and then this temperature was maintained for about 30 minutes. Next, the polymerization temperature was elevated in stages from the above temperature to 370° C. with stirring the mixture. The polymerization was carried out while acetic acid formed by the reaction was removed through a condenser. That is, the mixture was stirred at about 260° C. for about 40 minutes while acetic acid formed by the reaction was removed through the condenser. And then the temperature was elevated to 290° C. at which the polymerization was carried out for about one hour. The temperature was elevated to 320° C. at which the polymerization was further carried out for about one and a half hours. Next, the temperature was further elevated to 340° C. at which the introduction of a nitrogen gas was stopped, and under reduced pressure of 0.4 mmHg the polymerization was further carried out for about 30 minutes to complete the polymerization. Polymers thus prepared were cooled to room temperature and ground. Unreacted reactants were extracted with acetone and removed from the polymerization mixture, and then the polymers were dried in a vacuum oven at 130° C. for about 2 hours. It was found that polymers thus obtained had a logarithmic viscosity of 4.02. The melting temperatures of these polymers were measured by a differential scanning calorimeter running at a heating rate of 20° C. per minute under a nitrogen stream. It was found that the polymers exhibited a melt endotherm peak in the neighborhood of 250° C. and an optical anisotropy even above this temperature. The polymers were placed into a cylinder of an extruder, which was also equipped with a piston, a filter and a slit-type extrusion die and could be enclosed, heat and keep a constant temperature, and then heated to 300° C. to melt them completely. Next, the extruder was cooled to 260° C. to give an anisotropic melt. At this temperature, the resulting anisotropic melt was pressurized with a pressure of 7 atm. by operating the piston to extrude it through the slit die having thickness, width and length of 0.25 mm, 20 mm and 3 mm, respectively. Immediately after the extrusion, the resulting extrudates were stretched in a draw ratio of 16 while being quenched by cold air blown into the cylinder to give tape-shaped extrudates. (It was found that the resulting tape-shaped extrudates thus obtained were composed of fibrous materials consisting of numerous highly-oriented fibrils and could be easily divided into in their length directions to form fibers.) Fiber samples were taken from the resulting tape-shaped continuous extrudates and their physical properties were measured. It was found that the fiber samples exhibited a maximum tensile strength of 7.1 g/den., an elasticity modulus of 474 g/den., and an orientation angle of 9.3° as determined by an X-ray diffraction. Pulp-like short fibers thus prepared had thicknesses ranging from 0.1 μm to 20 μm, lengths ranging from 0.1 mm to 20 mm, and a specific surface area of 11 m²/g as measured by a nitrogen adsorption method.

EXAMPLE 6

72.0 G(0.40 mol.) of paraacetoxybenzoic acid, 24.9 g(0.15 mol.) of terephthalic acid, 8.3 g(0.05 mol.) of isophthalic acid and 54.5 g(0.202 mol.) of 4,4'-dimethoxybiphenyl were placed in a polymerizing flask equipped with a mechanical stirrer, a nitrogen inlet and a condenser. Then, the temperature of the flask was gradually elevated to 330° C. under a nitrogen stream. At this temperature, polymerization was carried out for 3 hours while stirring and further for an hour under reduced pressure of 0.2 mmHg to melt it completely. During the polymerization, acetic acid resulted from the polymerization reaction was removed through the condenser. The resulting polymers were allowed to be cooled to room temperature and then ground. Next, the unreacted materials were extracted with acetone and removed from the polymerization mixture. The resulting polymers were dried in a vacuum oven at 130° C. for 2 hours. It was found that these polymers formed an optically anisotropic melt above 350° C. These polymers were placed into a cylinder of an extruder, which was also equipped with a piston, a filter and a slit-type extrusion die and could be enclosed, heat and keep a constant temperature, and heated to 365° C. to melt them completely. Then, the resulting melt was allowed to be cooled to 350° C. to give an anisotropic melt. At this temperature, the resultant anisotropic melt was pressurized to a pressure of 8 atm. by operating the piston to extrude it through the slit die having thickness, width and length of 0.25 mm, 20 mm and 3 mm, respectively. Immediately after the extrusion, the resulting extrudates were stretched in a draw ratio of 12 while being quenched by cold air blown into the cylinder to give tape-shaped continuous extrudates. (The resulting tape-shaped extrudates were composed of fibrous materials consisting of numerous highly-oriented fibrils, and easily divided into in their length directions to form fibers.) Next, physical properties of sample fibers taken from the resulting tape-shaped continuous extrudates were measured. It was found that the sample fibers had a maximum tensile strength of 6.6 g/den., an elasticity modulus of 404 g/den., and an orientation angle of 18.0° as determined by an X-ray diffraction. These fibers were cut into 20 mm in length and beaten by a beater to prepare pulp-like short fibers. Pulp-like short fibers thus prepared had thicknesses ranging from 0.1 μm to 20 μm, lengths ranging from 0.1 mm to 20 mm, and a specific surface area of 9 m²/g as determined by a nitrogen adsorption method.

EXAMPLE 7

Tape-shaped extrudates obtained from Example 6 were subjected to heat drawing and heat treatment at 320° C. for 30 minutes to give fibril-like extrudates, from which fiber samples were taken and their physical properties were measured. It was found that the sample fibers had a maximum tensile strength of 14.6 g/den., an elasticity modulus of 876 g/den., and an orientation angle of 14.5° as determined by an X-ray diffraction. These fibers were cut into 20 mm in length and beaten by a beater to prepare pulp-like short fibers. Pulp-like short fibers thus prepared had thicknesses ranging from 0.1 μm to 20 μm, lengths ranging from 0.1 mm to 20 mm, and a specific surface area of 7 m²/g as determined by a nitrogen adsorption method.

EXAMPLE 8

69.1 G (0.36 mol.) of polyethyleneterephthalate having a logarithmic viscosity of 0.6 and 97.2 g (0.54 mol.) of paraacetoxybenzoic acid were placed into a polymerizing flask equipped with a mechanical stirrer, a nitrogen inlet and a condenser. Then, the temperature of the flask were gradually elevated to 275° C. under a nitrogen stream to melt the mixture completely. The resulting melted mixture was subjected to polymerization for an hour at 275° C. under a nitrogen stream. The polymers thus obtained had a logarithmic viscosity of 0.82, and exhibited a melt endotherm peak in the neighborhood of 245° C. and an optical anisotropy even above this temperature, when the melting temperatures thereof were measured by a differential scanning calorimeter running at a heating rate of 20° C. per minute under a nitrogen stream. These polymers were placed into a cylinder of an extruder, which was also equipped with a piston, a filter and a slit-type extrusion die and could be enclosed, heat and keep a constant temperature, and heated to a temperature of 280° C. to melt them completely. Then, the resulting melt was allowed to be cooled to 245° C. to obtain an anisotropic melt. At this temperature, the resultant anisotropic melt was pressurized to a pressure of 8 atm. by operating the piston to extrude it through the slit die Having thickness, width and length of 0.25 mm, 20 mm and 3 mm, respectively. Immediately after the extrusion, the resulting extrudates were stretched in a draw ratio of 24 while being quenched by cold air blown into the cylinder to give tape-shaped continuous extrudates. (The resulting tape-shaped extrudates were composed of fibrous materials consisting of numerous highly-oriented fibrils, and were easily divided into in their length directions to form fibers.) Next, physical properties of sample fibers taken from the tape-shaped extrudates were measured. It was found that the sample fibers had a maximum tensile strength of 5.6 g/den., an elasticity modulus of 251 g/den., and an orientation angle of 19.1° as determined by an X-ray diffraction. These fibers were cut into 20 mm in length and beaten by a beater to prepare pulp-like short fibers. Pulp-like short fibers thus prepared had thicknesses ranging from 0.1 μm to 20 μm, lengths ranging from 0.1 mm to 20 mm, and a specific surface area of 10 m²/g as determined by a nitrogen adsorption method.

EXAMPLE 9

54.0 G (0.2 mol.) of phenylhydroquinone diacetate and 31.6 g (0.19 mol.) of terephthalic acid were placed into a polymerizing flask equipped with a mechanical stirrer, a nitrogen inlet and a condenser, and then were subjected to polymerization for an hour at 290° C., for one and a half hours at 320° C., and subsequently for 2 hours at 340° C., under a nitrogen stream. In order to increase the degree of polymerization, the introduction of nitrogen was stopped at 340° C., and the polymerization was further carried out for about 30 minutes under reduced pressure of about 0.4 mmHg. After the completion of polymerization, polymers thus obtained had a logarithmic viscosity of 3.2 and exhibited a melt endotherm peak in the neighborhood of 340° C. and an optical anisotropy even above this temperature, when the melting temperatures thereof were measured by a differential scanning calorimeter running at a heating rate of 20° C. per minute under a nitrogen stream. These polymers were placed into a cylinder of an extruder, which was also equipped with a piston, a filter and a slit-type extrusion die and could be enclosed, heat and keep a constant temperature, and then heated to a temperature of 360° C. to melt them completely. Then the resulting melt was allowed to be cooled to 345° C. to obtain an anisotropic melt. Maintaining this temperature, the resultant anisotropic melt was pressurized to a pressure of 8 atm. by operating the piston to extrude it through the slit die having thickness, width and length of 0.25 mm, 20 mm and 3 mm, respectively. Immediately after the extrusion, the resulting extrudates were stretched in a draw ratio of 14 while being quenched by cold air blown into the cylinder to give tape-shaped continuous extrudates. (The resulting tape-shaped extrudates were composed of fibrous materials consisting of numerous highly-oriented fibrils, and were easily divided into in their length directions to form fibers.) Next, physical properties of sample fibers taken from the resulting tape-shaped extrudates were measured. It was found that the sample fibers had a maximum tensile strength of 6.2 g/den., an elasticity modulus of 423 g/den., and an orientation angle of 18.1° as determined by an X-ray diffraction. These fibers were cut into 20 mm in length and then beaten by a beater to prepare pulp-like short fibers. Pulp-like short fibers thus prepared had thicknesses ranging from 0.1 μm to 20 μm, lengths ranging from 0.1 mm to 20 mm, and a specific surface area of 9 m²/g as determined by a nitrogen adsorption method.

EXAMPLE 10

Tape-shaped extrudates obtained from Example 9 were subjected to heat drawing and heat treatment at 330° C. for 30 minutes to give fibril-like exudates, whose mechanical properties were found to be improved. Fiber samples were taken from the resulting fibril-like extrudates and their physical properties were measured. It was found that the fiber samples had a maximum tensile strength of 22.1 g/den., an elasticity modulus of 807 g/den., and an orientation angle of 16.3° as determined by an X-ray diffraction. The fibril-like fibers were cut into 20 mm in length and then beaten with a beater to produce pulp-like short fibers. Pulp-like short fibers thus produced had thicknesses ranging from 0.1 μm to 30 μm, lengths ranging from 0.1 mm to 20 mm, and a specific surface area of 6 m²/g as determined by a nitrogen adsorption method.

EXAMPLE 11

151.3 G (0.84 mol.) of paraacetoxybenzoic acid and 30.26 g (0.14 mol.) of 2,6-naphthalenedicarboxylic acid, 23.26 g (0.14 mol.) of isophthalic acid and 54.83 g(0.28 mol.) of hydroquinone diacetate were placed into a polymerizing flask equipped with a mechanical stirrer, a nitrogen inlet and a condenser, and were subjected to polymerization at 250° C. for about 2 hours under a nitrogen stream while acetic acid formed from the polymerization reaction was removed through the condenser. The reaction mixture was brought to a temperature of 280° C. and stirred for about 2 hours under a nitrogen stream while acetic acid resulting from the reaction was removed, and then the temperature was further elevated to 320° C. After the elevation of temperature, the introduction of nitrogen was stopped and polymerization was further carried out for about an hour under vacuum of 0.3 mmHg. After the completion of polymerization, the resultant polymers were allowed to be cooled to room temperature, pulverized, extracted with acetone to remove unreacted materials and then dried in a vacuum oven at 130° C. for about 2 hours. The polymers thus obtained had a logarithmic viscosity of 3.5 and exhibited an optical anisotropy above 275° C. These polymers were placed into a cylinder of an extruder, which was also equipped with a piston, a filter and a slit-type extrusion die and could be enclosed, heat and keep a constant temperature, and heated to 310° C. to melt them completely. Then, the resulting melt was allowed to be cooled to 280° C. to obtain an anisotropic melt. Maintaining this temperature, the resultant anisotropic melt was pressurized to a pressure of 10 atm. by operating the piston to extrude it through the slit die having thickness, width and length of 0.25 mm, 20 mm and 3 mm, respectively. Immediately after the extrusion, the resulting extrudates were stretched in a draw ratio of 14 while being quenched by cold air blown into the cylinder to give tape-shaped continuous extrudates. (The resulting tape-shaped extrudates were composed of fibrous materials consisting of numerous highly-oriented fibrils, and were easily divided into in their length directions to form fibers.) Next, physical properties of sample fibers taken from the resulting tape-shaped extrudates were measured. It was found that the sample fibers had a maximum tensile strength of 6.2 g/den., an elasticity modulus of 389 g/den., and an orientation angle of 20.2° as determined by an X-ray diffraction. These fibers were cut into 20 mm in length and then beaten by a beater to prepare pulp-like short fibers. Pulp-like short fibers thus prepared had thicknesses ranging from of 0.1 µm to 30 µm, lengths ranging from 0.1 mm to 20 mm, and a specific surface area of 30 $m^2/g$ as determined by a nitrogen adsorption method.

EXAMPLE 12

80.05 G (0.35 mol.) of 2-acetoxynaphthalene-6-carboxylic acid, 15.0 g (0.077 mol.) of hydroquinone diacetate and 12.45 g (0.075 mol.) of terephthalic acid were placed into a polymerizing flask equipped with a mechanical stirrer, a nitrogen inlet and a condenser, and then subjected to polymerization for 45 minutes at 250° C., for 45 minutes at 280° C., and subsequently for 30 minutes at 310° C., under a nitrogen stream. Then, after the polymerization temperature was further elevated to 320° C., the introduction of nitrogen was stopped and the polymerization was further carried out for about an hour under a vacuum of 0.1 mmHg. The resulting polymers had a logarithmic viscosity of 4.5. These polymers were placed into a cylinder of an extruder, which was also equipped with a piston, a filter and a slit-type extrusion die and could be enclosed, heat and keep a constant temperature, and heated to 320° C. to melt them completely. Then, the resulting melt was allowed to be cooled to 290° C. to obtain an anisotropic melt. Maintaining the temperature, the resultant anisotropic melt was pressurized to a pressure of 10 atm. by operating the piston to extrude it through the slit die having thickness, width and length of 0.25 mm, 20 mm and 3 mm, respectively. Immediately after the extrusion, the resulting extrudates were stretched in a draw ratio of 12 while being quenched by cold air blown into the cylinder to give tape-shaped continuous extrudates. (The tape-shaped extrudates thus prepared were composed of fibrous materials consisting of numerous highly-oriented fibrils, and were easily divided into in their length directions to form fibers.) Next, physical properties of sample fibers taken from the resulting tape-shaped extrudates were measured. It was found that the sample fibers had a maximum tensile strength of 7.6 g/den., an elasticity modulus of 489 g/den., and an orientation angle of 16.1° as determined by an X-ray diffraction. These fibers were cut into 20 mm in length and beaten by a beater to prepare pulp-like short fibers. Pulp-like short fibers thus prepared had thicknesses ranging from 0.1 µm to 20 µm, lengths ranging from 0.1 mm to 20 mm, and a specific surface area of 11 $m^2/g$ as determined by a nitrogen adsorption method.

EXAMPLE 13–30

The following pulp-like short fibers were prepared using the same extruder as used in Example 1, and polymers and extrusion conditions given in the table below. The results obtained are as listed in the table below:

| Ex. No. | Polymer Composition (mol.) | Extrusion Conditions* | Physical Properties of Fiber Samples** | Physical Properties of Pulp-like Short Fiber*** |
|---|---|---|---|---|
| 13 | phenylhydroquinone diacetate(50)<br>terephthalic acid(30)<br>2,6-naphthalenedicarboxylic acid(20) | 290° C./16<br>(3.1 dl/g) | 5.3 g/den/420 g/<br>den/18.5° | 0.1–30 µm/<br>0.1–20 mm/<br>9 $m^2/g$ |
| 14 | phenylhydroquinone diacetate(50)<br>terephthalic acid(30)<br>4,4'-biphenyldicarboxylic acid(20) | 285° C./15<br>(3.2 dl/g) | 3.7 g/den/455 g/<br>den/19.6° | 0.1–30 µm/<br>0.1–20 mm/<br>6 $m^2/g$ |
| 15 | phenylhydroquinone diacetate(50)<br>2,6'-naphthalenedicarboxylic acid(30)<br>4,4'-biphenyldicarboxylic acid(20) | 280° C./25<br>(4.1 dl/g) | 6.5 g/den/460 g/<br>den/17.0° | 0.1–20 µm/<br>0.1–20 mm/<br>11 $m^2/g$ |
| 16 | chlorohydroquinone diacetate(50)<br>terephthalic acid(35)<br>4,4'-dicarboxydiphenyl ether(15) | 310° C./11<br>(2.9 dl/g) | 4.0 g/den/373 g/<br>den/20.5° | 0.1–35 µm/<br>0.1–20 mm/<br>5 $m^2/g$ |
| 17 | chlorohydroquinone diacetate(40)<br>4,4'-diacetoxybiphenyl(10)<br>terephthalic acid(40)<br>isophthalic acid(10) | 305° C./13<br>(3.0 dl/g) | 4.3 g/den/440 g/<br>den/17.4° | 0.1–25 (µm/<br>0.1–20 mm/<br>8 $m^2/g$ |
| 18 | paraacetoxybenzoic acid(60)<br>2,6-naphthalenedicarboxylic acid(20)<br>hydroquinone diacetate(20) | 330° C./12<br>(insol) | 6.2 g/den/435 g/<br>den/19.5° | 0.1–20 µm/<br>0.1–20 mm/<br>11 $m^2/g$ |
| 19 | paraacetoxybenxoic acid(50)<br>phenylhydroquinone diacetate(25)<br>terephthalic acid(40)<br>2,6-naphthalenedicarboxylic acid(10) | 240° C./17<br>(3.9 dl/g) | 6.6 g/den/460 g/<br>den/16.4° | 0.1–20 µm/<br>0.1–20 mm/<br>11 $m^2/g$ |
| 20 | paraacetoxybenzoic acid(50)<br>phenylhydroquinone diacetate(25)<br>terephthalic acid(40) | 245° C./15<br>(3.4 dl/g) | 5.3 g/den/490 g/<br>den/17.8° | 0.1–20 µm/<br>0.1–20 mm/<br>12 $m^2/g$ |

-continued

| Ex. No. | Polymer Composition (mol.) | Extrusion Conditions* | Physical Properties of Fiber Samples** | Physical Properties of Pulp-like Short Fiber*** |
|---|---|---|---|---|
| 21 | 4,4-biphenyldicarboxylic acid(10) paraacetoxybenzoic acid(50) phenylhydroquinone diacetate(25) 2,6-naphthalenedicarboxylic acid(15) | 245° C./29 (3.3 dl/g) | 7.3 g/den/470 g/ den/16.5° | 0.1–15 μm/ 0.1–20 mm/ 14 m²/g |
| 22 | 4,4-biphenyldicarboxylic acid(10) paraacetoxybenzoic acid(50) hydroquinone diacetate(25) isophthalic acid(6.25) terephthalic acid(18.75) | 360° C./15 (2.3 dl/g) | 5.5 g/den/560 g/ den/18.2° | 0.1–20 μm/ 0.1–20 mm/ 10 m²/g |
| 23 | paraacetoxybenzoic acid(60) hydroquinone diacetate(20) 2,6-naphthalenedicarboxylic acid(10) isophthalic acid(10) | 285° C./19 (3.4 dl/g) | 6.5 g/den/420 g/ den/17.6° | 0.1–25 μm/ 0.1–20 mm/ 8 m²/g |
| 24 | paraacetoxybenzoic acid(60) 2,6-naphthalenedicarboxylic acid(20) hydroquinone diacetate(15) resorcinol diacetate(5) | 290° C./18 (3.3 dl/g) | 5.3 g/den/450 g/ den/19.5° | 0.1–30 μm/ 0.1–20 mm/ 9 m²/g |
| 25 | paraacetoxybenzoic acid(60) metaacetoxybenzoic acid(5) terephthalic acid(17.5) 2,6-diacetoxynaphthalene(17.5) | 330° C./15 (3.4 dl/g) | 3.7 g/den/340 g/ den/19.5° | 0.1–30 μm/ 0.1–20 mm/ 6 m²/g |
| 26 | paraacetoxybenzoic acid(65) metaacetoxybenzoic acid(5) 2,6-naphthalenedicarboxylic acid(15) hydroquinone diacetate(15) | 315° C./17 (3.6 dl/g) | 3.4 g/den/360 g den/18.6° | 0.1–30 μm/ 0.1–20 mm/ 8 m²/g |
| 27 | paraacetoxybenzoic acid(35) 2-acetoxynaphthalene-6-carboxylic acid terephthalic acid(20) hydroquinone diacetate(20) | 280° C./28 (4.2 dl/g) | 10.4 g/den/ 450 g/den/ 16.5° | 0.1–20 μm/ 0.1–20 mm/ 14 m²/g |
| 28 | paraacetoxybenzoic acid(60) 2-acetoxynaphthalene-6-carboxylic acid(14) terephthalic acid(13) 2,6-diacetoxynaphthalene(13) | 350° C./17 (3.2 dl/g) | 6.0 g/den/550 g/ den/17.5° | 0.1–25 μm/ 0.1–20 mm/ 9 m²/g |
| 29 | paraacetoxybenzoic acid(50) 2-acetoxynaphthalene-6-carboxylic acid(10) terephthalic acid(20) 4,4-'diacetoxybiphenyl(20) | 320° C./36 (5.7 dl/g) | 11.4 g/den/ 605 g/den/ 16.3° | 0.1–20 μm/ 0.1–20 mm/ 12 m²/g |
| 30 | 2-acetoxynaphthalene-6-carboxylic acid(30) 4-acetoxy-4'-bipenylcarboxylic acid (30) terephthalic acid(20) hydroquinone diacetate(20) | 265° C./12 (7.5 dl/g) | 12.5 g/den/ 510 g/den/ 17.2° | 0.1–20 μm/ 0.1–20 mm/ 10m/²g |

Note:
*: Temperature / Draw ratio (log Viscosity)
**: Max. Tensile Strength/Elasticity modulus/Orientation angle
***: Thickness/Length/Specific Surface area Although the Invention has been described with preferred embodiments, it is to be understood that variations and modifications may be employed without departing from the concept of the invention as defined in the following claims.

What is claimed is:

1. Pulp-like short fibers prepared by first heating liquid-crystalline polyesters capable of forming an anisotropic melt phase at a temperature of 200° C. to 400° C. and having a molecular weight of 2,000 to 100,000 at a temperature sufficient to melt them completely to give a uniform hot melt, and then cooling the hot melt to a temperature just above its melting point to form an anisotropic melt, followed by extrusion, said fibers having a good dispersibility and easiness in manufacturing paper, and the following highly-oriented fiber characteristics and properties:

(a) Tensile strength: 5–30 g/den.;
   (b) Modulus of elasticity: 200–1,500 g/den.;
   (c) Orientation angle as determined by an X-ray diffraction: below 25°;
   (d) Thickness distribution: 0.1–50 μm;
   (e) Length distribution: 0.1–50 mm; and
   (f) Specific surface area as determined by a nitrogen adsorption method: 3–30 m²/g.

2. The pulp-like short fibers according to claim 1, wherein said liquid crystal polyesters are copolyesters comprising 20 to 80 moles of parahydroxybenzoic acid and 20 to 80 moles of one or two or more of aromatic hydroxycarboxylic acids selected from the group consisting of metahydroxybenzoic acid, 2-hydroxynaphthalene-6-carboxylic acid, 4'-hydroxy-4-biphenylcarboxylic acid, 4-hydroxyphenylacetic acid, 4-hydroxyphenylpropionic acid and 2-(4-carboxyphenoxy) ethanol.

3. The pulp-like short fibers according to claim 1 or 2, wherein said liquid crystal polyesters are copolyesters comprising 30 to 70 moles parahydroxybenzoic acid and 30 to 70 moles of 2-hydroxynaphthalene-6-carboxylic acid.

4. The pulp-like short fibers according to claim 1, wherein said liquid crystal polyesters are copolyesters comprising 10 to 80 moles of one or two or more of aromatic hydroxycarboxylic acid selected from parahydroxybenzoic acid, 2-hydroxynaphthalene- 6-carboxylic acid, metahydroxybenzoic acid, 4'-hydroxy- 4-biphenylcarboxylic acid, 4-hydroxyphenyl acetic acid, 4-hydroxyphenylpropionic acid, 2-(4-carboxyphenoxy) ethanol, 10 to 45 moles of one or two or more of aromatic diols selected from the group consisting of hydroquinone, phenylhydroquinone, methylhydroquinone, tert.-butylhydroquinone, chlorohydroquinone, 4,4'-dihydroxybiphenyl, 2,6-dihydroxynaphthalene, 2,7-dihydroxynaphthalene, 2,6,-dihydroxyanthraquinone, resorcinol, 4,4'-dihydroxybenzophenone, 4,4'-dihydroxydiphenylmethane, 4,4'-dihydroxydiphenylethane, 2,2-bis(4-hydroxyphenyl)propane, 4,4'-dihydroxydiphenyl ether, 4,4'-dihydroxydiphenyl sulfone and 4,4'-dihydroxydiphenyl sulfide, and 10 to 45 moles of one or two or more of aromatic dicarboxylic acids selected from the group consisting of terephthalic acid, isophthalic acid, 2,6-naphthalenedicarboxylic acid, 2,7-naphthalenedicarboxylic acid, 4,4'-biphenyldicarboxylic acid, 4,4'-dicarboxydiphenyl ether, 3,4'-dicarboxydiphenyl ether and 1,2-bis(4-carboxyphenoxy)ethane.

5. The pulp-like short fibers according to claim 1 or 4, wherein said liquid crystal polyesters are copolyesters comprising 30 to 70 moles of parahydroxybenzoic acid, 15 to 35 moles of 4,4'-dihydroxybiphenyl, $X$ moles of terephthalic acid and $Y$ moles of isophthalic acid wherein $X$ is 15 to 30, $Y$ is 5 to 20, and $X+Y$ is 15 to 35.

6. The pulp-like short fibers according to claim 1 or 4, wherein said liquid crystal polyesters are copolyesters comprising 30 to 70 moles of parahydroxybenzoic acid, 15 to 35 moles of 4,4'-dihydroxybiphenyl, $Z$ moles of 2,6-naphthalene dicarboxylic acid, $Y$ mole(s) of isophthalic acid and $X$ mole(s) of terephthalic acid wherein $Z$ is 5 to 35, $X$ and $Y$ are each 0 to 30, and $X+Y+Z$ is 15 to 35.

7. The pulp-like short fibers according to claim 1 or 4, wherein said liquid crystal polyesters are copolyesters comprising 30 to 70 moles of parahydroxybenzoic acid, 15 to 35 moles of phenylhydroquinone, $X$ moles of terephthalic acid and $Y$ mole(s) of isophthalic acid wherein $X$ is 15 to 35, $Y$ is 0 to 20, and $X+Y$ is 15 to 35.

8. The pulp-like short fibers according to claim 1 or 4, wherein said liquid crystal polyesters are copolyesters comprising 30 to 70 moles of parahydroxybenzoic acid, 15 to 35 moles of phenylhydroquinone, $Z$ moles of 2,6-naphthalene dicarboxylic acid, $Y$ mole(s) of isophthalic acid and $X$ mole(s) of terephthalic acid wherein $Z$ is 5 to 35, $X$ and $Y$ are each 0 to 30, and $X+Y+Z$ is 15 to 35.

9. The pulp-like short fibers according to claim 1 or 4, wherein said liquid crystal polyesters are copolyesters comprising 30 to 70 moles of parahydroxybenzoic acid, 15 to 35 moles of methylhydroquinone, $X$ moles of terephthalic acid and $Y$ moles of isophthalic acid wherein $X$ and $Y$ are each 5 to 30, and $X+Y$ is 15 to 35.

10. The pulp-like short fibers according to claim 1 or 4, wherein said liquid crystal polyesters are copolyesters comprising 30 to 70 moles of parahydroxybenzoic acid, 15 to 35 moles of methylhydroquinone, $Z$ moles of 2,6-naphthalenedicarboxylic acid, $Y$ mole(s) of isophthalic acid and $X$ mole(s) of terephthalic acid wherein $Z$ is 5 to 35, $X$ and $Y$ are each 0 to 30, and $X+Y+Z$ is 15 to 35.

11. The pulp-like short fibers according to claim 1 or 4, said liquid crystal polyesters are copolyesters comprising 30 to 70 moles of parahydroxybenzoic acid, 15 to 35 moles of hydroquinone, $X$ moles of terephthalic acid and $Y$ moles of isophthalic acid wherein $X$ and $Y$ are each 5 to 30, and $X+Y$ is 15 to 35.

12. The pulp-like short fibers according to claim 1 or 4, wherein said liquid crystal polyesters are copolyesters comprising 30 to 70 moles of parahydroxybenzoic acid, 15 to 35 moles of hydroquinone, $Z$ moles of 2,6-naphthalenedicarboxylic acid, $Y$ moles of isophthalic acid and $X$ moles of terephthalic acid wherein $Z$ is 5 to 35, $X$ and $Y$ are each 5 to 30, and $X+Y+Z$ is 15 to 35.

13. The pulp-like short fibers according to claim 1 or 4, wherein said liquid crystal polyesters are copolyesters comprising 30 to 70 moles of 2-hydroxynaphthalene-6-carboxylic acid, 15 to 35 moles of 4,4'-dihydroxybiphenyl, $X$ moles of terephthalic acid and $Y$ mole(s) of isophthalic acid wherein $X$ is 5 to 35, $Y$ is 0 to 30, and $X+Y$ is 15 to 35.

14. The pulp-like short fibers according to claim 1 or 4, wherein said liquid crystal polyesters are copolyesters comprising 10 to 70 moles of 2-hydroxynaphthalene-6-carboxylic acid, 15 to 45 moles of phenylhydroquinone, $X$ moles of terephthalic acid and $Y$ mole(s) of isophthalic acid wherein $X$ is 5 to 45, $Y$ is 0 to 20, and $X+Y$ is 15 to 45.

15. The pulp-like short fibers according to claim 1 or 4, wherein said liquid crystal polyesters are copolyesters comprising 30 to 70 moles of 2-hydroxynaphthalene-6-carboxylic acid, 15 to 35 moles of methylhydroquinone, $X$ moles of terephthalic acid and $Y$ moles of isophthalic acid wherein $X$ and $Y$ are each 5 to 30, and $X+Y$ is 15 to 35.

16. The pulp-like short fibers according to claim 1 or 4, wherein said liquid crystal polyesters are copolyesters comprising 30 to 70 moles of 2-hydroxynaphthalene-6-carboxylic acid, 15 to 35 moles of hydroquinone, $X$ moles of terephthalic acid and $Y$ moles of isophthalic acid wherein $X$ and $Y$ are each 5 to 30, and $X+Y$ is 15 to 35.

17. The pulp-like short fibers according to claim 1 or 4, wherein said liquid crystal polyesters are copolyesters comprising 30 to 70 moles of a mixture of parahydroxybenzoic acid and 2-hydroxynaphthalene-6-carboxylic acid, 15 to 35 moles of 4,4'-dihydroxybiphenyl, $X$ moles of terephthalic acid and $Y$ mole(s) of isophthalic acid wherein $X$ is 15 to 35, $Y$ is 0 to 20, and $X+Y$ is 15 to 35.

18. The pulp-like short fibers according to claim 1 or 4, wherein said liquid crystal polyesters are copolyesters comprising 30 to 70 moles of a mixture of parahydroxybenzoic acid and 2-hydroxynaphthalene-6-carboxylic acid, 15 to 35 moles of phenylhydroquinone, $X$ moles of terephthalic acid and $Y$ mole(s) of isophthalic acid wherein $X$ is 15 to 35, $Y$ is 0 to 20, and $X+Y$ is 15 to 35.

19. The pulp-like short fibers according to claim 1 or 4, wherein said liquid crystal polyesters are copolyesters comprising 30 to 70 moles of a mixture of parahydroxybenzoic acid and 2-hydroxynaphthalene-6-carboxylic acid, 15 to 35 moles of methylhydroquinone, $X$ moles of terephthalic acid and $Y$ mole(s) of isophthalic acid wherein $X$ is 15 to 35, $Y$ is 0 to 20, and $X+Y$ is 15 to 35.

20. The pulp-like short fibers according to claim 1 or 4, wherein said liquid crystal polyesters are copolyesters comprising 30 to 70 moles of a mixture of parahydroxybenzoic acid and 2-hydroxynaphthalene-6-carboxylic acid, 15 to 35 moles of hydroquinone, $X$ moles of terephthalic acid and $Y$ mole(s) of isophthalic acid wherein $X$ is 15 to 35, $Y$ is 0 to 20, and $X+Y$ is 15 to 35.

21. The pulp-like short fibers according to claim 1, wherein said liquid crystal polyesters are copolyesters comprising 50 moles of one or two or more of aromatic diols selected from the group consisting of hydroquinone, phenylhydroquinone, methylhydroquinone, tert.-butylhydroquinone, chlorohydroquinone, 4,4'-dihydroxybiphenyl, 2,6-dihydroxynaphthalene, 2,7-dihydroxynaphthalene, 2,6-dihydroxyanthraquinone, resorcinol, 4,4'- dihydroxybenzophenone, 4,4'-dihydroxydiphenylmethane, 4,4'-dihydroxydiphenylethane, 2,2-bis(4-hydroxyphenyl)propane, 4,4'-dihydroxydiphenyl ether, 4,4'-dihydroxydiphenyl sulfone, 4,4'-dihydroxydiphenyl sulfide, and 50 moles of one or two or more of aromatic dicarboxylic acids selected from the group consisting of terephthalic acid, isophthalic acid, 2,6-naphthalenedicarboxylic acid, 2,7-naphthalenedicarboxylic acid, 4,4'-biphenyldicarboxylic acid, 4,4'-dicarboxydiphenyl ether, 3,4'-dicarboxydiphenyl ether, 1,2-bis(4-carboxyphenoxy)ethane.

22. The pulp-like short fibers according to claim 1 or 21, wherein said liquid crystal polyester is copolyester comprising 50 moles of phenylhydroquinone and 50 moles of terephthalic acid.

23. The pulp-like short fibers according to claim 1, wherein said liquid crystal polyesters are copolyesters comprising 20 to 80 moles of one or two or more of aromatic hydroxycarboxylic acids selected from the group consisting of parahydroxybenzoic acid, 2-hydroxynaphthalene-6-carboxylic acid, metahydroxybenzoic acid, 4'-hydroxy-4-biphenylcarboxylic acid, 4-hydroxyphenylacetic acid, 4-hydroxyphenylpropionic acid and 2-(4-carboxyphenoxy)ethanol, 10 to 40 moles of one or two or more of aromatic dicarboxylic acids selected from the group consisting of terephthalic acid, isophthalic acid, 2,6-naphthalenedicarboxylic acid, 2,7-naphthalenedicarboxylic acid, 4,4'-biphenyldicarboxylic acid, 4,4'-dicarboxydiphenyl ether, 3,4'-dicarboxydiphenyl ether and 1,2-bis(4-carboxyphenoxy)ethane, and 10 to 40 moles of one or two or more of aliphatic diols selected from the group consisting of ethylene glycol, 1,3-propanediol, 1,4-butanediol, trans-1,4,-dihydroxycyclohexane, cis-1,4-dihydroxycyclohexane, trans-1,4-cyclohexanedimethanol and cis-1,4-cyclohexanedimethanol.

24. The pulp-like short fibers according to claim 1 or 23, wherein said liquid crystal polyesters are copolyesters comprising 30 to 70 moles of parahydroxybenzoic acid, 15 to 35 moles of terephthalic acid and 15 to 35 moles of ethylene glycol.

25. The pulp-like short fibers according to claim 1, wherein said liquid crystal polyesters are copolyesters comprising 10 to 70 moles of parahydroxybenzoic acid, 15 to 45 moles of one or two or more of aromatic dicarboxylic acids selected from the group consisting of terephthalic acid, isophthalic acid, 2,6-naphthalenedicarboxylic acid, 2,7-naphthalenedicarboxylic acid, 4,4'-biphenyldicarboxylic acid, 4,4'-dicarboxydiphenyl ether, 3,4'-dicarboxydiphenyl ether and 1,2-bis(4-carboxyphenoxy)ethane, X moles of one or two or more of aromatic diols selected from the group consisting of hydroquinone, phenylhydroquinone, methylhydroquinone, tert.-butylhydroquinone, chlorohydroquinone, 4,4'-dihydroxybiphenyl, 2,6-dihydroxynaphthalene, 2,7-dihydroxynaphthalene, 2,6-dihydroxyanthraquinone, resorcinol, 4,4'-dihydroxybenzophenone, 4,4'-dihydroxydiphenylmethane, 4,4'-dihydroxydiphenylethane, 2,2-bis(4-hydroxyphenyl)propane, 4,4'-dihydroxydiphenyl ether, 4,4'-dihydroxydiphenyl sulfone and 4,4'-dihydroxydiphenyl sulfide and Y moles of one or two or more aliphatic diols selected from the group consisting of ethylene glycol, 1,3-propanediol, 1,4-butanediol, trans-1,4-dihydroxycyclohexane, cis-1,4-dihydroxycyclohexane, trans-1,4-cyclohexanedimethanol and cis-1,4-cyclohexanedimethanol wherein X and Y are each 5 to 40, and X+Y is 15 to 45.

26. The pulp-like short fibers according to claim 1, wherein said liquid crystal polyesters are copolyesters comprising 15 to 40 moles of one or two or more of aromatic diols selected from the group consisting of hydroquinone, phenylhydroquinone, methylhydroquinone, tert.-butylhydroquinone, chlorohydroquinone, 4,4'-dihydroxybiphenyl, 2,6-dihydroxynaphthalene, 2,7-dihydroxynaphthalene, 2,6-dihydroxyanthraquinone, resorcinol, 4,4'-dihydroxybenzophenone, 4,4'-dihydroxydiphenylmethane, 4,4'-dihydroxydiphenylethane, 2,2-bis(4-hydroxyphenyl)propane, 4,4'-dihydroxydiphenyl ether, 4,4'-dihydroxydiphenyl sulfone and 4,4'-dihydroxydiphenyl sulfide, 10 to 35 moles of one or two or more of aliphatic diols selected from the group consisting of ethylene glycol, 1,3-propanediol, 1,4-butanediol, trans-1,4-dihydroxycyclohexane, cis-1,4-dihydroxycyclohexane, trans-1,4-cyclohexanedimethanol and cis-1,4-cyclohexanedimethanol, and 50 moles of one or two or more of aromatic dicarboxylic acids selected from the group consisting of terephthalic acid, isophthalic acid, 2,6-naphthalenedicarboxylic acid, 2,7-naphthalenedicarboxylic acid, 4,4'-biphenyldicarboxylic acid, 4,4'-dicarboxydiphenyl ether, 3,4'-dicarboxydiphenyl ether and 1,2-bis(4-carboxyphenoxy)ethane.

27. The pulp-like short fibers according to claim 1, wherein said liquid crystal polyesters are those polyesters which can be formed into an anisotropic melt phase at a temperature ranging from 220° C. to 360° C.

28. The pulp-like short fibers according to claim 1, wherein the molecular weight of said liquid crystal polyesters ranges from 5,000 to 50,000.

29. The pulp-like short fibers according to claim 1, which have highly-oriented fiber characteristics of a tensile strength of 10 g/den. to 25 g/den., an elasticity modulus of 300 g/den. to 1000 g/den., and an orientation angle of below 20° as determined by an X-ray diffraction.

30. The pulp-like short fibers according to claim 1, which have thicknesses ranging from 0.1 μm to 20 μm and lengths ranging from 0.1 mm to 20 mm.

31. The pulp-like short fibers according to claim 1, which have a surface area of 5 $m^2$/g to 20 $m^2$/g.

* * * * *

UNITED STATES PATENT AND TRADEMARK OFFICE
CERTIFICATE OF CORRECTION

PATENT NO.   : 5,454,910
DATED        : October 3, 1995
INVENTOR(S)  : Han Sik YOON, et al.

It is certified that error appears in the above-indentified patent and that said Letters Patent is hereby corrected as shown below:

On the title page, Item [73], the Assignee should read:

--Korea Institute of Science and Technology--

Signed and Sealed this

Twenty-sixth Day of December, 1995

Attest:

BRUCE LEHMAN

*Attesting Officer*  *Commissioner of Patents and Trademarks*